United States Patent [19]
Flagge

[11] 3,832,781
[45] Sept. 3, 1974

[54] MEASURING PROBE POSITION RECORDER

[75] Inventor: Bruce Flagge, Yorktown, Va.

[73] Assignee: The United States of America as represented by the National Aeronautics and Space Administration, Washington, D.C.

[22] Filed: Jan. 12, 1973

[21] Appl. No.: 322,998

[52] U.S. Cl. .................. 33/23 R, 33/1 M, 338/89, 340/347 AD, 346/33 R
[51] Int. Cl. .......................... G01b 7/28, G01d 5/16
[58] Field of Search ........ 346/29, 33 R; 178/18, 19, 178/20; 33/1 M, 23 B, 23 R, 174 L; 340/347 AD; 235/189, 186; 338/89, 90, 91

[56] References Cited
UNITED STATES PATENTS

| | | | |
|---|---|---|---|
| 3,122,673 | 2/1964 | Dutton et al. | 338/89 X |
| 3,182,339 | 5/1965 | Price | 33/23 |
| 3,500,379 | 3/1970 | Gibbons et al. | 340/347 AD |
| 3,561,125 | 2/1971 | Zeidler | 33/174 L |

Primary Examiner—Joseph W. Hartary
Attorney, Agent, or Firm—Howard J. Osborn; William H. King; John R. Manning

[57] ABSTRACT

This invention is a device for enabling a person to record the locations of measurements made by a hand-held noncontacting probe. The hand probe is coupled to a linear potentiometer and a sine-cosine potentiometer by means that varies the output of the linear potentiometer proportional to the distance between the hand probe and the linear potentiometer and that varies the output of the sine-cosine potentiometer proportional to the angular movement of the hand probe relative to the sine-cosine potentiometer. The output of the linear potentiometer is applied directly to one input of the sine-cosine potentiometer and is applied through an inverter to the other input or the sine-cosine potentiometer. The cosine and sine outputs of the sine-cosine potentiometer are applied to the X and Y outputs, respectively, of an X–Y recorder. Hence, as the hand probe moves over a model the stylus on the X–Y recorder makes corresponding moves over the X–Y recorder. Consequently, the person using the hand probe can move the probe along the outline of the model causing a similar outline to be reproduced on the X–Y recorder. Then the person can make structural measurements on the model and when interesting measurements are made, he can, with the aid of the stylus, mark the points on the recorded outline where these measurements are made.

1 Claim, 5 Drawing Figures

PATENTED SEP 3 1974 3,832,781

MEASURING PROBE POSITION RECORDER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to recorders and more specifically concerns a recorder for recording the locations of measurements made by a hand-held noncontacting probe.

Displacement measurements of structural vibrations have only recently been possible using a hand-held noncontacting probe. Information on peak and minimum vibration locations at different exciting frequencies is helpful in a study of a structure. In the past, to obtain this information the investigators have drawn on the model or made band sketches of the model modes. This invention is a device which enables the investigator to draw an outline of the model with an X–Y recorder and then locate on the outline drawing points of interest. The device gives the investigator an accurate fix on the location, at any time, of the hand-held noncontacting probe.

SUMMARY OF THE INVENTION

The invention includes a means for coupling a hand-held noncontacting probe to a linear potentiometer and a sine-cosine potentiometer that varies the output of the linear potentiometer proportional to the distance between the hand probe and the linear potentiometer and that varies the output of the sine-cosine potentiometer proportional to the angular movement of the hand probe relative to the sine-cosine potentiometer. The output of the linear potentiometer is applied directly to one of the inputs of the sine-cosine potentiometer and is applied through an inverter to the other input of the sine-cosine potentiometer. The cosine and sine outputs of the sine-cosine potentiometer are applied to the X and Y inputs, respectively, of an X–Y recorder. Consequently, the stylus of the X–Y recorder assumes positions on the X–Y recorder corresponding to the positions of the hand probe as it moves over a model.

In one embodiment of the invention the coupling means is a flexible string that is wound around the shaft of the linear potentiometer. The shaft of the linear potentiometer is coupled to a motor which maintains a constant tension on the string. Hence, as the hand probe moves away from the linear potentiometer the output of the linear potentiometer is increased and as the hand probe moves toward the linear potentiometer the output of the linear potentiometer is decreased. Since the motor maintains a constant tension on the string, when the output of the linear potentiometer is decreased the string is rewound on the shaft of the potentiometer. In this embodiment an elongated, rigid member is attached to the shaft of the sine-cosine potentiometer with the string extending through the elongated member such that as the hand probe moves angularly with respect to the sine-cosine potentiometer the string applies a force to the elongated rigid member thereby causing the shaft of the sine-cosine potentiometer to follow the angular motion of the hand probe.

In a second embodiment of the invention a mounting means is attached to the shaft of the sine-cosine potentiometer. In this embodiment, the coupling means is a rigid means which is mounted on the mounting means so as to impart a rotation to the shaft of the sine-cosine potentiometer whenever the hand probe moves angularly with respect to the potentiometer. The linear potentiometer is also mounted on the mounting means with a sprocket wheel that meshes with a chain that is attached to the rigid means. Consequently, when the hand probe moves either away from or toward the mounting means, the chain imparts a rotation to the sprocket which varies the linear potentiometer.

DETAILED DESCRIPTION OF THE INVENTION

Figure 1:
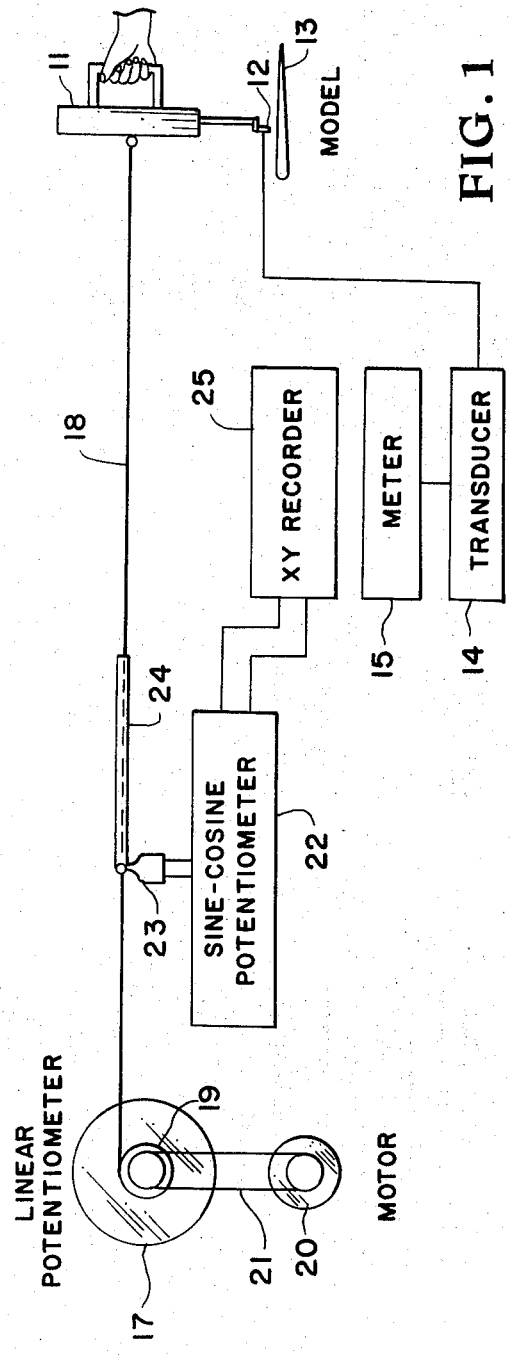
FIG. 1 is a schematic side view of a first embodiment of the invention.
Figure 2:
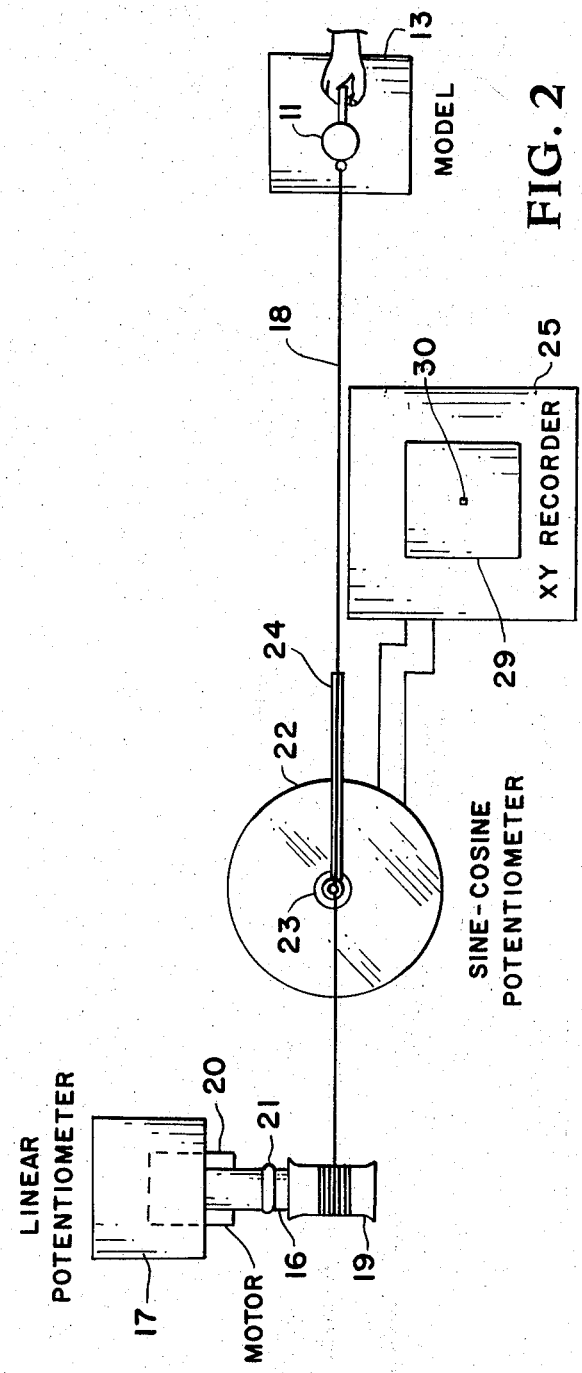
FIG. 2 is a schematic top view of the first embodiment of the invention.

Turning now to the first embodiment of the invention selected for illustration in FIGS. 1 and 2 of the drawing, the number 11 designates a noncontacting hand-held probe. Attached to the end of probe 11 is a sensor 12 for moving over the surface of a model 13. Connected to sensor 12 is a transducer 14 for producing an electrical signal proportional to the distance between sensor 12 and model 13. The output of transducer 14 is measured by a meter 15. Hence, as an investigator moves sensor 12 over the surface of model 13 by means of probe 11 he can view the readings on meter 15.

Hand probe 11 is coupled to the shaft 16 of a linear potentiometer 17 by means of a spool 19 on the end of the shaft and a flexible member such as a string 18. The shaft of a motor 20 is coupled to shaft 16 by means of a belt 21 to maintain a constant tension on string 18. Consequently, as hand-probe 11 moves away from the linear potentiometer 17 string 18 turns shaft 16 in the direction to increase the output of the potentiometer; and as probe 11 moves in the direction of linear potentiometer 17, motor 20 by means of belt 21, turns shaft 16 in the direction to rewind string 18 on spool 19 thereby decreasing the output of linear potentiometer 17.

Figure 3:
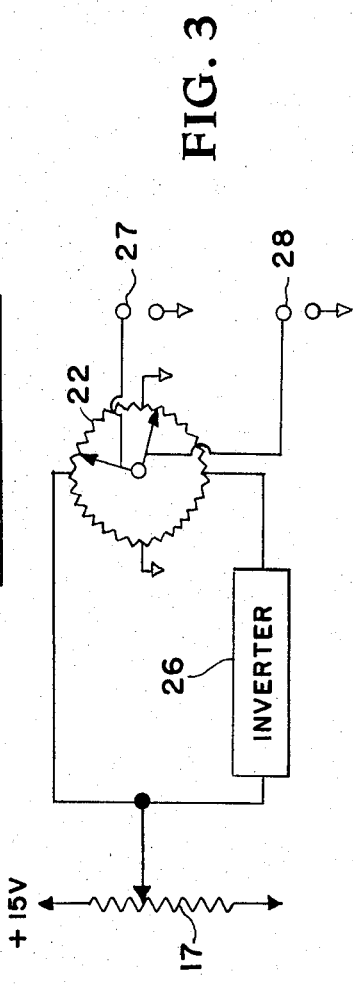
FIG. 3 is a schematic drawing of the electrical circuit used by the invention.

Located between hand probe 11 and potentiometer 17 is a sine-cosine potentiometer 22 having a shaft 23. Attached to shaft 23 for rotation therewith is a rigid elongated member 24 that extends in the direction of hand probe 11. Elongated member 24 can be, for example, a piece of channel iron with small openings in its ends through which string 18 passes. Thus, as probe 11 moves angularly relative to sine-cosine potentiometer 22, string 18 exerts force against member 24 which turns shaft 23 of sine-consine potentiometer 22 thereby providing sine and cosine outputs proportional to the angular movement of probe 11. The cosine and sine outputs of sine-cosine potentiometer 22 are applied to the X and Y inputs, respectively, of an X–Y recorder 25. As shown in FIG. 3, the slider output of potentiometer 17 is applied directly to one of the inputs of potentiometer 22 and is applied through an inverter 26 to the other input of potentiometer 22. The slider outputs 27 and 28 of potentiometer 22 are applied to the inputs of the X–Y recorder 25. Therefore, if hand probe 11 is moved to extend string 18 by a length L and to rotate potentiometer 22 through an angle $\theta$, the X input to X–Y recorder 25 would be L cosine $\theta$ and the Y input to recorder 25 would be L sine $\theta$ which would be the two coordinates of the sensing element 12.

In the operation of this invention the investigator moves the hand probe 11 along the periphery of model 13 which causes an outline 29 of the model to be drawn on the X–Y recorder 25 by means of a stylus 13. The investigator then makes measurements on model 13 and when he discovers or makes an interesting reading that he wants to make a record of, he causes stylus 13 to make a dot within the outline 29 on recorder 25 thereby making a permanent record of the location of the interesting reading.

Figure 5:
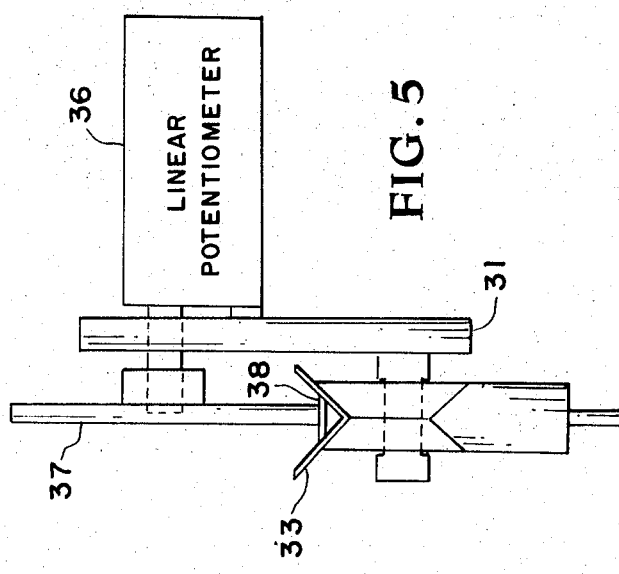
FIG. 5 is a schematic end view of the second embodiment of the invention.
Figure 4:
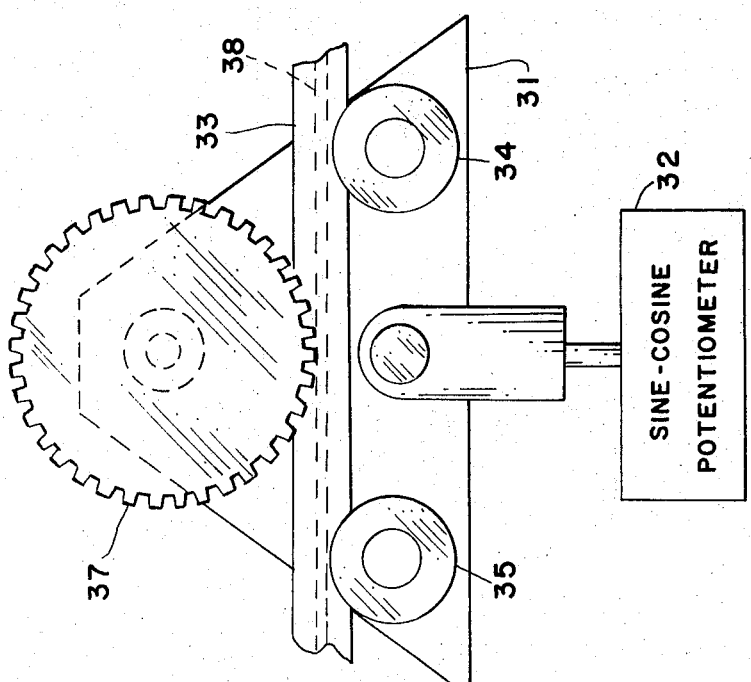
FIG. 4 is a schematic side view of a second embodiment of the invention.

In the second embodiment of the invention selected for illustration in FIGS. 4 and 5, there is shown a mounting means 31 mounted for rotation on the shaft of a sine-cosine potentiometer 32. A rigid member 33 such as a piece of angle iron is mounted on mounting means 31 by means of wheels 34 and 35 which allow the rigid member to move back and forth on the wheels relative to the mounting means 31. Also mounted on mounting means 31 is a linear potentiometer 36 which has its shaft coupled to a sprocket wheel 37. A chain 38 is attached to rigid member 33 such that the teeth of sprocket wheel 37 mesh with the chain. Attached at one end of rigid member 38 is a hand probe which is not shown in the drawings. Hence, as the operator moves the hand probe back and forth, sprocket wheel 37 is rotated which varies the output of linear potentiometer 36. Also, as the position of the hand probe varies angularly with respect to sine-cosine potentiometer 32, the rigid member 33 rotates mounting means 31 on the shaft of the sine-cosine potentiometer thereby varying its output. The other parts of this embodiment of the invention are exactly the same as the first embodiment of the invention described above.

The advantage of this invention is that it enables the investigator to draw the model shape with an X–Y recorder and then locate on the drawing points of interest.

What is claimed as new and desired to be secured by Letters Patent of the United States is:

1. Apparatus for making a sketch of a model and for marking on the sketch the locations of interesting measurements made on the model by a hand-held non-contacting measuring probe comprising:

an X–Y recorder having an X input and a Y input;

a sine-cosine potentiometer with its cosine and sine slider outputs connected to the X input and Y input, respectively, of said X–Y recorder;

an inverter;

a linear potentiometer means for producing at its slider output a voltage that is directly proportional to the position of the slider and with its slider output connected directly to one of the inputs of said sine-cosine potentiometer and connected through said inverter to the other input of said sine-cosine potentiometer; and means coupled to said hand probe and to the sliders of said linear and sine-cosine potentiometers for varying the position on the slider of said linear potentiometer means proportional to distance between said hand probe and said linear potentiometer means and for varying the position of the slider outputs of said sine-cosine potentiometer proportional to the angular movement of said hand probe relative to said sine-cosine potentiometer;

wherein said means coupled to said hand probe and to said linear and sine-cosine potentiometers is a flexible member wound on the shaft of said linear potentiometer means so as to vary its output as said probe moves relative to said linear potentiometer means, a motor means coupled to the shaft of said linear potentiometer means for maintaining a tension in said flexible member and an elongated rigid member attached to the shaft of said sine-cosine potentiometer, extending in the direction of said hand probe, and containing said flexible member;

whereby the stylus on said X–Y recorder will assume positions on said recorder corresponding to the positions of said probe as it moves over said model.

* * * * *